United States Patent
Lai et al.

(10) Patent No.: US 7,550,951 B2
(45) Date of Patent: Jun. 23, 2009

(54) TWO-STEP BATTERY CHARGER

(75) Inventors: Yu-Chi Lai, Taoyuan (TW); Ji-Shun Liao, Taoyuan (TW)

(73) Assignee: Asian Power Devices Inc., Taoyuan (TW)

( * ) Notice: Subject to any disclaimer, the term of this patent is extended or adjusted under 35 U.S.C. 154(b) by 290 days.

(21) Appl. No.: 11/542,530

(22) Filed: Oct. 3, 2006

(65) Prior Publication Data

US 2008/0136373 A1    Jun. 12, 2008

(51) Int. Cl.
*H02J 7/16* (2006.01)
*H02J 7/06* (2006.01)
*G05F 1/00* (2006.01)
*H01F 38/00* (2006.01)
*H01F 27/42* (2006.01)
*H02M 7/5383* (2007.01)
*H02M 1/00* (2007.01)
*H02M 3/335* (2006.01)

(52) U.S. Cl. .................. 320/163; 320/162; 323/265; 323/266; 323/355; 323/356; 363/74; 363/78; 363/80

(58) Field of Classification Search ......... 320/139–140, 320/145, 152, 157–159, 160, 162–164; 323/15, 323/19, 21.01, 21.07–21.09, 21.1–21.13, 323/21.15, 74, 78, 80; 363/265–266, 273–277, 363/281–285, 355–359
See application file for complete search history.

(56) References Cited

U.S. PATENT DOCUMENTS 5,029,266 A * 7/1991 Randolph ................... 320/150
7,005,914 B2 * 2/2006 Balakrishnan et al. ...... 327/589

* cited by examiner

*Primary Examiner*—Akm E Ullah
*Assistant Examiner*—Richard V Muralidar
(74) *Attorney, Agent, or Firm*—Charles E. Baxley

(57) ABSTRACT

A two-step charger includes an AC/DC power supply, a transformer, a compensator, a controller, a comparator and an isolating controller. The comparator detects whether a battery is connected to the transformer. If so, a command voltage of the charger is set at a high level. Since the battery voltage is lower than the command voltage, the controller orders the compensator to send out a compensating current. The current entering the primary side of the transformer is increased to promote the output current from the secondary side of the transformer. Once the comparator detects that the battery reaches as high as the charger, the command voltage is adjusted to a low level. The controller orders the compensator to stop outputting the compensating current. Therefore, a larger current can speed up battery charging. Once the battery is fully charged, the charging voltage is lowered to avoid high temperature.

10 Claims, 2 Drawing Sheets

TWO-STEP BATTERY CHARGER

BACKGROUND OF THE INVENTION

1. Field of the Invention

The invention relates to a charger and, in particular, to a two-step charger that can adjust the level of its charging command voltage depending upon the charging status of the battery.

2. Description of Related Art

In view of environmental protection, many objects that cannot be decomposed by nature or cause pollution after they are decomposed are phasing out. For example, non-rechargeable batteries contain materials harmful to the environment. Therefore, rechargeable batteries become more popular nowadays. With an appropriate charger, the rechargeable batteries can be repeatedly used.

Most of the chargers on the market have the function of two-step charging. That is, they allow the user to decide whether to charge the batteries at a normal speed or a faster speed. The so-called quick charging refers to the charging with a larger current. Although this method can finish charging in a shorter time, people normally do not immediately remove the batteries from the charger once it is done. Therefore, the larger current usually produces a high temperature on the batteries. If the batteries are exposed to the high temperature for a long time, their lifetime may be greatly shortened.

Charging at a normal speed refers to the charging with a smaller current. As a result, the charging time is longer. It may take several hours to charge a battery in this scheme. Therefore, it is inconvenient.

From the above description, it is seen that current chargers are unable to charge batteries at a quicker speed without sacrificing their lifetime.

SUMMARY OF THE INVENTION

To achieve a balance between shortening the charging time and maintaining the battery lifetime, the invention provides a two-step charger that adjusts the magnitude of charging current according to the charging status of the battery.

To achieve the above objective, the two-step charger includes: an AC/DC power supply, a transformer, a compensator, a controller, a comparator, and an isolating controller.

The AC/DC power supply is connected to an AC source and converts the AC current into a first DC current for output.

The transformer has a primary side and a secondary side. The primary side is connected to the AC/DC power supply. The secondary side detects the first DC current and outputs a second DC current. The secondary side is connected to batteries in a removable way.

The compensator is connected to both ends of the primary side of the transformer and outputs a compensating current to increase the DC current entering the primary side of the transformer.

The controller is connected to the transformer and the compensator.

The comparator is connected between the secondary side of the transformer and the battery to determine the charging status of the battery.

The isolating controller has an emitting end and a receiving end. The emitting end is connected to the comparator. The receiving end is connected to the controller. The isolating controller operates the controller according to the charging status of the battery, so that the compensator sends out a compensating current to change the magnitude of the second DC current.

Using the above-mentioned techniques, the disclosed charger uses the comparator to detect whether a battery is connected to the transformer. If so, the controller orders the compensator to send out a compensating current, thereby increasing the current entering the primary side of the transformer and thus the current output by the secondary side of the transformer. Once the comparator detects that the battery is fully charged, the controller stops the compensator from sending out the compensating current. Therefore, the invention can set the charging voltage at a high level to provide a larger current for charging the battery, thus shortening the charging time. After the battery is fully charged, the voltage is lowered to reduce the current entering the battery. This helps reducing the temperature on the battery. Therefore, the battery lifetime is not sacrificed due to quick charging.

DETAILED DESCRIPTION OF THE PREFERRED EMBODIMENT

Figure 1:
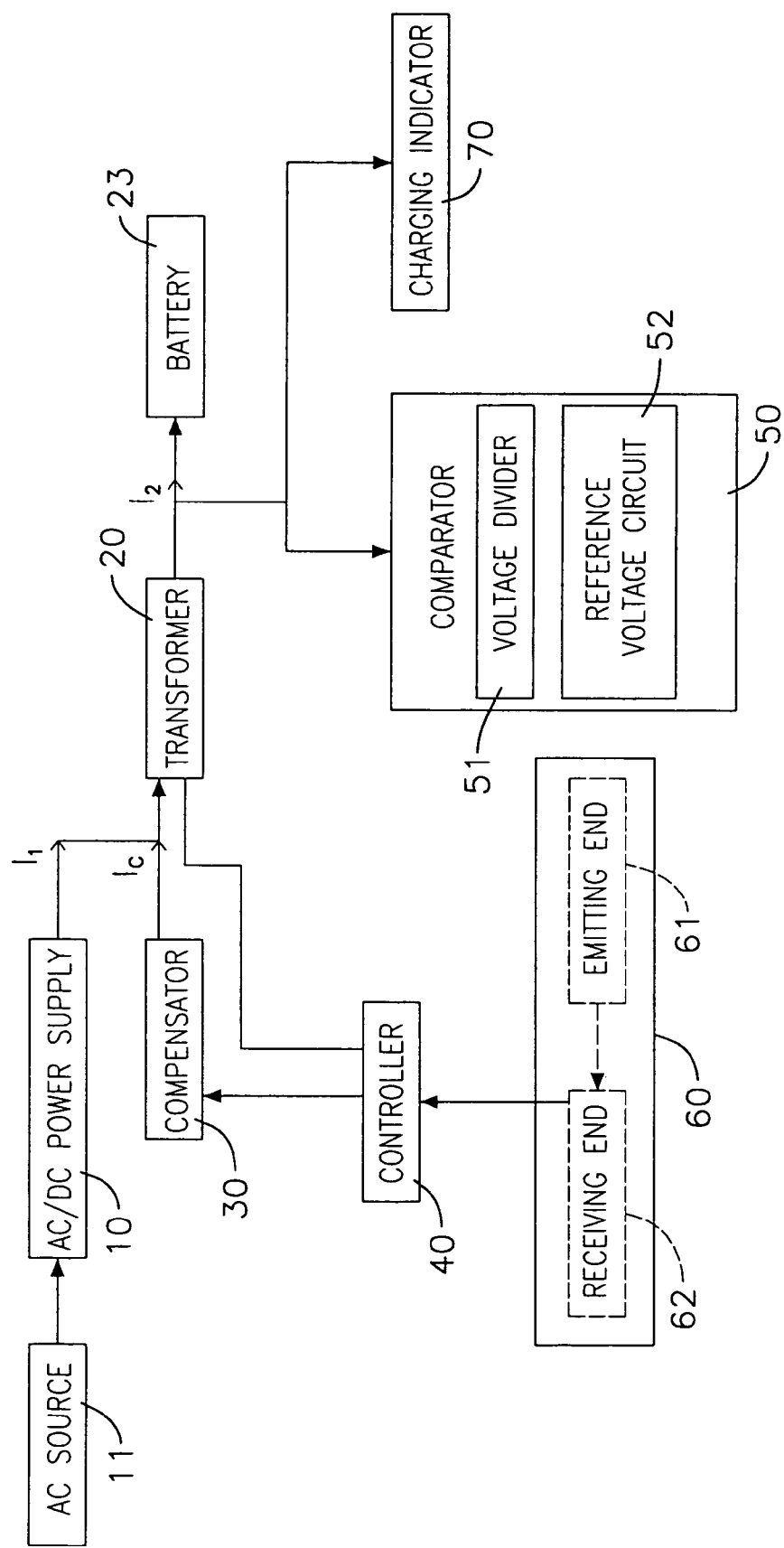
FIG. 1 is a functional block diagram of the preferred embodiment of the invention.

As shown in FIG. 1, a preferred embodiment of the disclosed two-step charger includes: an AC/DC power supply 10, a transformer 20, a compensator 30, a controller 40, a comparator 50, an isolating controller 60, and a charging indicator 70.

The AC/DC power supply 10 is connected to an AC source 11 and converts the AC current into a first DC current $I_1$ for output.

The transformer has a primary side and a secondary side (both not shown). The primary side is connected to the AC/DC power supply 10. The secondary side detects the first DC current $I_1$ and outputs a second DC current $I_2$. The secondary side is connected to a battery 23 in a removable way.

The compensator 30 is connected to the primary side of the transformer 20 and outputs a compensating current $I_C$ to increase the DC current entering the primary side of the transformer 20.

The controller 40 is connected to the transformer 20 and the compensator 30 to control the compensator 30 in outputting the compensating current $I_C$.

The comparator 50 is connected between the secondary side of the transformer 20 and the battery 23 to determine the charging status thereof.

The isolating controller 60 has an emitting end 61 and a receiving end 62. The emitting end 61 is connected to the comparator 50. The receiving end 62 is connected to the controller 40. The isolating controller 60 operates the controller 40 according to the charging status of the battery 23, so that the compensator 30 sends out a compensating current $I_C$ to change the magnitude of the second DC current $I_2$. Once the comparator 50 detects that the battery 23 is fully charged, the controller 40 stops the compensator 30 from sending out the compensating current $I_C$. A smaller current $I_2$ is then used to charge the battery 21.

The charging indictor 70 is connected to the battery 23 and the comparator 50 to display the charging status of the battery 23.

Figure 2:
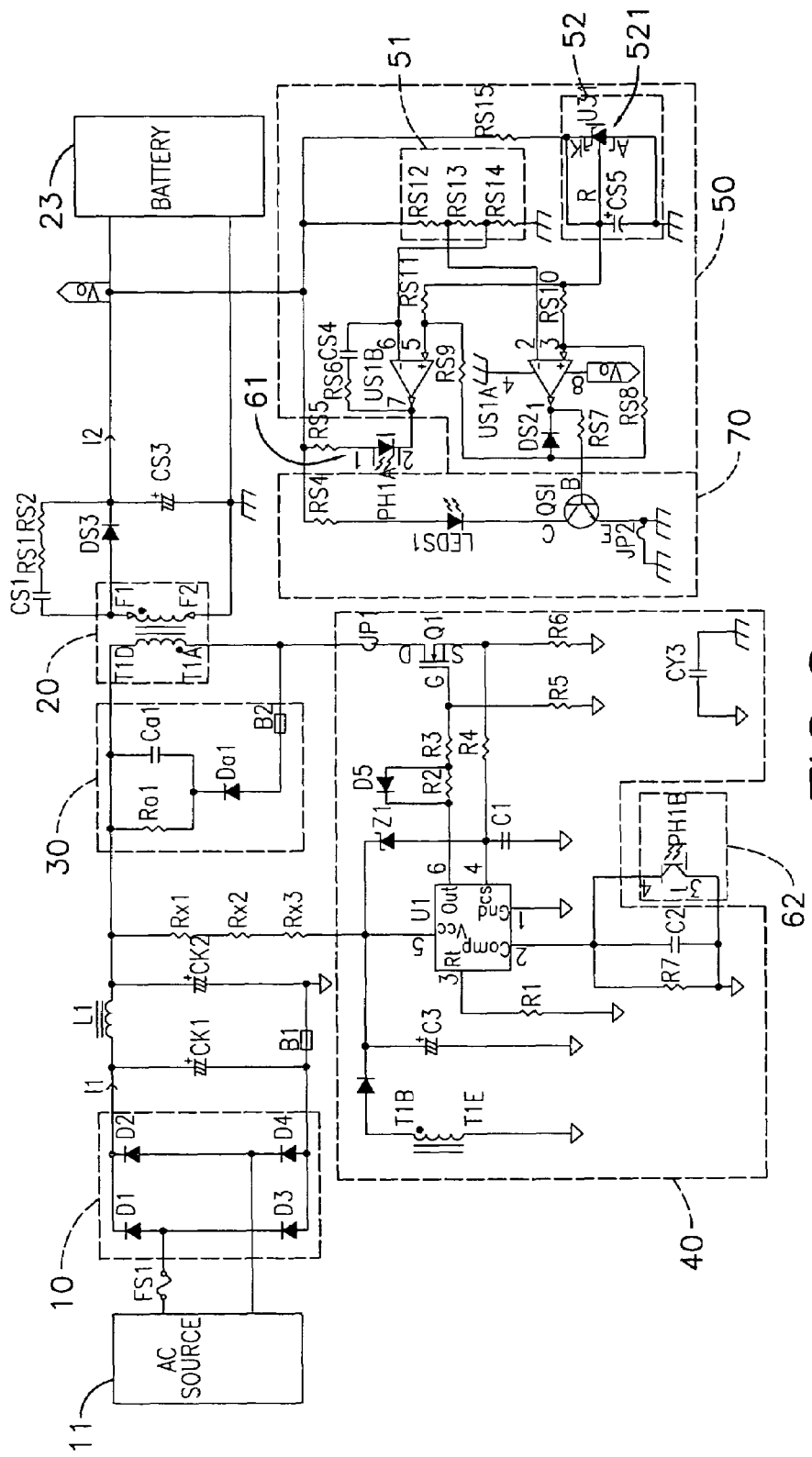
FIG. 2 is a circuit diagram of the preferred embodiment.

A detailed circuit of the above-mentioned embodiment is shown in FIG. 2.

The AC/DC power supply 10 comprises primarily a full-wave rectifier (D1~D4).

The compensator 30 comprises a resistor Ra1, a capacitor Ca1, and a diode Da1. The capacitor Ca1 and the resistor Ra1 are connected in parallel before connecting to the diode Da1 in series. The other ends of the capacitor Ca1 and the resistor Ra1 are connected to one end on the primary side 21 of the transformer 20. The other end of the diode Da1 is connected to the other end of the primary side 21 of the transformer 20.

The controller 40 mainly includes a control IC U1 and a metal oxide semiconductor (MOS) transistor Q1. The control IC U1 obtains its work power from the AC/DC power supply 10. The gate of the MOS transistor Q1 is connected to the control IC U1. The drain is connected to the primary side 21 of the transformer 20 and the diode Da1. The source is connected to the ground.

The comparator 50 includes a voltage divider 51, a reference voltage circuit 52, a first comparator US1A, and a second comparator US1B. The voltage divider 51 is composed of resistors RS12~RS14 connected in series. The resistor RS12 is connected to the secondary side 22 of the transformer 20 and the battery 23. The resistor RS14 is connected to the ground. The reference voltage circuit 52 includes a reference voltage IC 521. In this embodiment, the reference voltage IC 521 is the TL431 IC. Its anode A is connected to the ground, while its cathode K is connected to the secondary side 22 of the transformer 20 and the battery 23. The positive input of the first comparator US1A is connected to the reference electrode R of the reference voltage IC 521 to obtain a reference voltage. The negative input is connected between the resistors RS12 and RS13 to obtain the partial voltage drop between the resistors RS13 and RS14. The positive input of the second comparator US1B is connected to the output of the first comparator US1A via a diode DS2, and to the reference electrode R of the reference voltage IC 521 to obtain the reference voltage. The negative input is connected between the resistors RS13 and RS14 to obtain the voltage drop across the resistor RS14.

The isolating controller 60 in this embodiment is a photo coupler. The emitting end 61 of the isolating controller 60 is an equivalent light-emitting diode (LED) inside the photo coupler, and is connected between the secondary side 22 of the transformer 20 and the output terminal of the second comparator US1B. The receiving end 62 of the isolating controller 60 is the equivalent light-emitting transistor (LET) inside the photo coupler, and is connected to one input terminal of the control IC U1.

The charging indictor 70 includes an LED LEDS1 and a transistor QS1 in this embodiment. The LED LEDS1 is connected to the secondary side 22 of the transformer 20 and the battery 23. The base of the transistor QS1 is connected to the output terminal of the first comparator US1A. The collector of the transistor QS1 is connected to the LED LEDS1.

The action of the above-mentioned two-step charger is explained with further reference to FIG. 2.

When the battery 23 is not yet connected to the invention, the second DC current $I_2$ completely flows into the comparator 50 so that the partial voltage drops between the resistors RS13 and RS14 and the resistor RS14 are both higher than the reference voltage. Therefore, both the first comparator US1A and the second comparator US1B output a low-voltage signal. The transistor QS1 cuts off, and therefore the LED LEDS1 does not emit light. On the other hand, the equivalent LED of the photo coupler emits light, making the equivalent LET of the photo coupler conductive. At this moment, the control IC U1 sends out a work signal to make the MOS transistor Q1 conductive.

When the invention is connected with a battery 23 without sufficient energy, some of the second DC current $I_2$ flows into the battery 23. The partial voltage between the resistor RS13 and the resistor RS14 and the partial voltage on the resistor RS14 are both lower than the reference voltage. Therefore, both the first comparator US1A and the second comparator US1B output a high-level signal. The transistor QS1 is thus conductive so that the LED LEDS1 emits light. The equivalent LED of the photo coupler, on the other hand, does not emit light. Consequently, the equivalent LET of the photo coupler is not conductive, either. In this case, the control IC U1 detects that the equivalent LET is not conductive and stops sending out the work signal. The MOS transistor Q1 is off. As a result, the current flowing through the primary side 21 of the transformer 20 cannot pass through the MOS transistor Q1 and enter the ground. It flows instead into the compensator 30. The compensator 30 further sends out a compensating current $I_C$, so that the DC current on the primary side entering the transformer 20 is $I_1 + I_C$. Therefore, the second DC current $I_2$ also increases to charge the battery 23 at a larger current.

Once the battery 23 is fully charged, the current entering the battery 23 decreases, raising the current sending into the comparator 50. The partial voltages between the resistors RS13 and RS14 and across the resistor RS14 are both higher than the reference voltage. Therefore, both the first comparator US1A and the second comparator US1B output a low-level signal. Therefore, the transistor QS1 cuts off, and the LED LEDS1 does not emit light. The equivalent LED of the photo coupler is conductive and thus emits light. As a result, the equivalent LET of the photo coupler is conductive. The control IC U1 detects the conduction of the equivalent LET and sends out a work signal so that the MOS transistor Q1 is conductive. Therefore, the current flowing through the primary side 21 of the transformer 20 can pass through the MOS transistor Q1 and enter the ground, instead of flowing into the compensator 30. The compensator 30 no longer sends out the compensating current $I_C$. Therefore, the current on the primary side 21 of the transformer 20 is only $I_1$, greatly reducing the charging current on the battery 23.

According to the above description, the disclosed two-step charger uses its comparator to detect whether a battery is attached and whether the battery is fully charged. When the battery needs to be charged, the isolating controller orders the controller to increase the output current from the secondary side of the transformer, thereby speeding up the battery charging. Once the battery is fully charged, the isolating controller orders the controller to reduce the output current from the secondary side of the transformer. Therefore, a larger current is used to charge a battery when it requires charging. The current is lowered to the normal range once the battery is fully charged. This avoids high temperature on a fully charged battery. The lifetime of battery therefore does not get shorter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-step charger comprising:
    an AC/DC power supply connected to an AC source and converting an AC current to a first DC current for output;
    a transformer having a primary side and a secondary side, the primary side connected to the AC/DC power supply, the secondary side outputting a second DC current based on the first DC current and connected to a battery in a removable way;

a compensator connected to both ends of the primary side of the transformer and sending a compensating current to increase a DC current entering the primary side of the transformer;

a controller connected to the transformer and the compensator;

a comparator unit connected between the secondary side of the transformer and the battery to determine a charging status of the battery, the comparator unit comprising;

a voltage divider comprising first, second, and third resistors connected in series, the first resistor connected to the secondary side of the transformer and the battery, and the third resistor connected to the ground;

a reference voltage circuit comprising a reference voltage IC to provide a reference voltage;

a first comparator having a positive input connected to the reference voltage IC to obtain the reference voltage, and having a negative input connected between the first resistor and the second resistor to obtain the voltage drop across the second and third resistors; and a second comparator having a positive input connected to the reference voltage IC and output terminal of the first comparator via a diode, and having a negative input connected between the second resistor and the third resistor to obtain the voltage drop across the third resistor; and an isolating controller having an emitting end and a receiving end, the emitting end connected to the comparator unit, and the receiving end connected to the controller;

wherein the isolating controller operates the controller according to the charging status of the battery, so that the compensator sends the compensating current to change the magnitude of the second DC current.

2. The two-step charger as claimed in claim 1, the compensator comprising a resistor, a capacitor, and a diode, wherein the capacitor and the resistor are connected in parallel and then connected to the diode in series, the other ends of the capacitor and the resistor are connected to one end of the primary side of the transformer, and the other end of the diode is connected to the other end of the primary side of the transformer.

3. The two-step charger as claimed in claim 1, the controller including a control IC and a MOS transistor having a gate, a drain and a source, wherein the control IC obtains a work power from the AC/DC power supply, the gate of the MOS transistor is connected to the control IC, the drain is connected to the primary side of the transformer and the compensator, and the source is connected to the ground.

4. The two-step charger as claimed in claim 1 further comprising a charging indicator connected to the compensator for displaying the charging status of the battery.

5. The two-step charger as claimed in claim 4, the charging indicator including a light-emitting diode (LED) and a transistor, wherein a positive terminal of the LED is connected to the secondary side of the transformer and the battery; and a base of the transistor is connected to the output terminal of the first comparator, and a collector of the transistor is connected to a negative terminal of the LED.

6. The two-step charger as claimed in claim 1, wherein the isolating controller is a photo coupler, wherein the emitting end of the isolating controller is an equivalent LED inside the photo coupler and connected between the secondary side of the transformer and the output terminal of the second comparator; and the receiving end of the isolating controller is an equivalent light-emitting transistor inside the photo coupler and connected to the controller.

7. The two-step charger as claimed in claim 2, the controller including a control IC and a MOS transistor having a gate, a drain and a source, wherein the control IC obtains a work power from the AC/DC power supply, the gate of the MOS transistor is connected to the control IC, the drain is connected to the primary side of the transformer and the compensator, and the source is connected to the ground.

8. The two-step charger as claimed in claim 7 further comprising a charging indicator connected to the compensator for displaying the charging status of the battery.

9. The two-step charger as claimed in claim 8, the charging indicator including a light-emitting diode (LED) and a transistor, wherein a positive terminal of the LED is connected to the secondary side of the transformer and the battery; and a base of the transistor is connected to the output terminal of the first comparator, and a collector of the transistor is connected to a negative terminal of the LED.

10. The two-step charger as claimed in claim 9, the isolating controller being a photo coupler, wherein the emitting end of the isolating controller is an equivalent LED inside the photo coupler connected between the secondary side of the transformer and the output terminal of the second comparator; and the receiving end of the isolating controller is an equivalent light-emitting transistor inside the photo coupler and connected to the controller.

* * * * *